May 26, 1964

J. P. WOODS ETAL 3,134,634

VARIABLE INTENSITY RECORDING

Filed Jan. 11, 1963

INVENTORS.
John P. Woods.
Joseph A. Profera.
BY Charles F. Steininger

ATTORNEY.

INVENTORS.
John P. Woods.
Joseph A. Profera
BY Charles F. Steininger
ATTORNEY.

3,134,634
VARIABLE INTENSITY RECORDING
John P. Woods, Dallas, Tex., and Joseph A. Profera, Reynoldsburg, Ohio, assignors to The Atlantic Refining Company, Philadelphia, Pa., a corporation of Pennsylvania
Filed Jan. 11, 1963, Ser. No. 250,932
11 Claims. (Cl. 346—1)

The present invention relates to a novel method and apparatus for recording information in variable intensity form on a record. More specifically, the invention relates to an improved, simplified method and apparatus for recording seismic information in variable intensity form.

Although numerous variable intensity recorders are presently available, most of them are photographic recorders and all of them are complicated and expensive. Regardless of the type of recorder, present day variable intensity recorders are objectionable in that they are delicate, usually cumbersome, and very limited in their versatility.

It is, therefore, an object of the present invention to provide an improved direct writing variable intensity recorder.

Another object of the present invention is to provide a versatile direct writing recorder capable of producing variable intensity and wiggly line records.

Another object of the present invention is to provide a simplified, rugged variable intensity recorder that is easy to maintain and is suitable for both office and field operations.

Another object of the present invention is to provide a method of improving intensity resolution by recording a relatively thin oscillatory trace so that it appears as a trace of appreciable width.

Another object of the present invention is to provide an improved, versatile direct writing recorder capable of producing wiggly line and various types of variable intensity recordings, all of which are suitable for recording seismograms, cross-section records and the like.

Other objectives and advantages of the present invention will be apparent to those skilled in the art when reference is made to the accompanying disclosure and drawings.

Briefly described the invention comprises (a) vibrating a direct-contact writing element that records a relatively thin oscillatory trace at a frequency sufficiently high to produce an optical effect of recording a trace having a relatively large width, and (b) simultaneously intensity modulating the relatively thin width oscillatory trace with a signal to produce an optical effect of recording the relatively large width trace in variable intensity form. In more detail the method includes the steps of, (a) Supplying a constant frequency carrier having a frequency substantially above the frequency range of the signal which is to be recorded but below a frequency of about 1000 c.p.s., (b) Vibrating a direct-contact writing element in accordance with the constant carrier frequency, (c) Recording a visible trace oscillating at the constant carrier frequency, and (d) Controlling the intensity of the trace as a function of the signal wherein the signal in the no signal condition produces a given trace tone and the polarity and amplitude of the signal determine the instantaneous direction and the amount of tone change from the given trace tone.

This method of variable intensity presentation can be modified to produce a wiggly line variable intensity presentation by the additional step of adding the signal to the constant frequency carrier. For purposes of this application the term "tone" is used to designate the value or the degree of lightness and darkness of the recorded trace.

Although the invention is applicable to recording various types of information, it is illustrated and described as a method for describing seismic information wherein.

Figure 1:
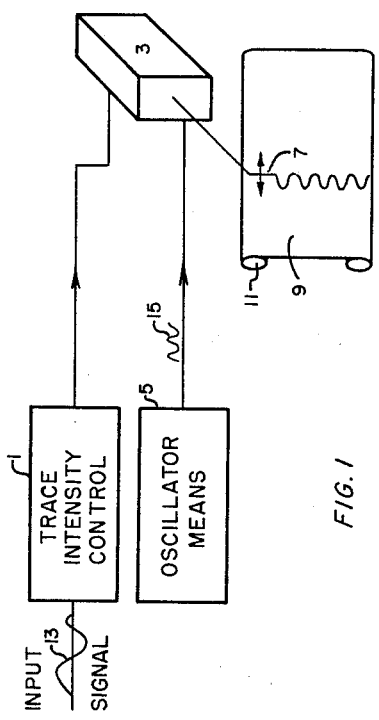
FIGURE 1 shows a block diagram of a device capable of practicing the invention.

FIGURE 1 shows a block diagram of a device capable of practicing the unique method of variable intensity recording. Trace intensity control means 1 is connected to recorder means 3. Oscillator means 5 is also connected to the recorder means. The recorder means includes recording element 7 adapted to directly contact record 9 mounted on record drive means 11.

Figure 2:
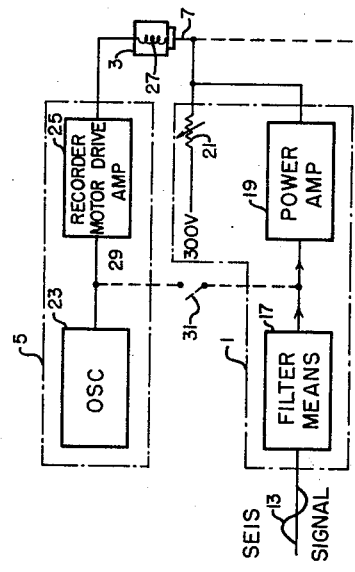
FIGURE 2 shows a block diagram of a thermographic recorder capable of practicing the invention.
Figure 4:
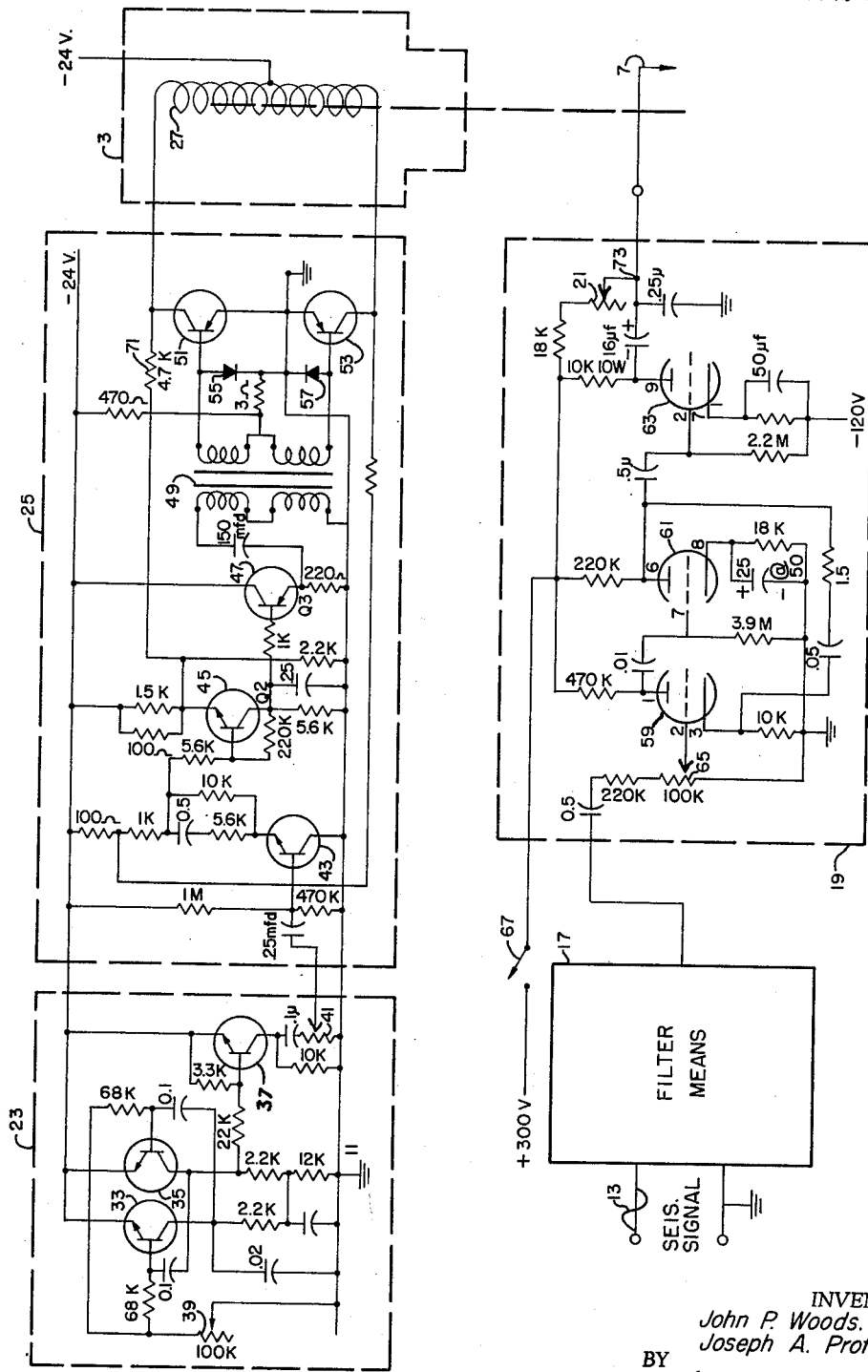
FIGURE 4 shows a circuit diagram of the device illustrated in FIGURE 2.

Trace intensity control means 1 uses the intelligence carried by signal 13 to control the tone of the trace recorded by 7. The devices shown in FIGURES 2 and 4 are designed to work with amplitude varying signals such as 13, however, with modifications obvious to those skilled in the art the invention can be made to work with signals bearing intelligence in FM or AM form by the addition of appropriate detector circuits. Of course, the manner in which the trace tone is controlled depends upon the type of recording element 7 used; that is, if electrographic or thermographic recording is used, the trace tone can be controlled by the amount of voltage applied to the recording element. If recording element 7 is an ink pen the trace tone can be controlled by the mixture, color, etc., of the ink passed through 7. Regardless of the type of recording element 7 used, it is necessary to calibrate the intensity control means so that the zero signal condition of signal 13 produces a trace tone that can be varied through the amplitude extremes of signal 13 and still produce a visible trace on record 9.

Tone variations produced by trace intensity control means 1 are much more easily recognized on a trace having appreciable width than on a relatively narrow width trace normally produced by recording element 7. Therefore, oscillator means 5 is designed to vibrate recording element 7 at a desired constant frequency and amplitude to produce an optical effect of a trace having appreciable width. This desired frequency must be substantially higher than the frequency of input signal 13. The resolution of the tone variation is improved with increase in the frequency at which recording element 7 is vibrated. That is, the higher frequency oscillations appear as closely spaced parallel lines which give the optical effect of a single trace whose width is equal to the plus and minus excursion of the vibrating recording element 7. The physical limitations of vibrating a given recorder means 3 set the maximum practical frequency that can be used. In the illustration, input signal 13 is a seismic signal which varies in frequency from approximately 15 to 100 c.p.s. and oscillator means 5 is adjusted to operate at approximately 400 c.p.s. In most cases recording element 7 cannot be oscillated above approximately 1000 c.p.s. due to structural limitations of the recorder. In cases where the input signal 13 is of relatively high frequency, recording element 7 should be vibrated at maximum frequency to obtain the maximum number of lines, on which the tone variation is superimposed.

Recorder means 3 is designed to move recording element 7 in accordance with the output signal of oscillator means 5. The recorder should have a rectilinear presentation and a frequency response that extends from approximately 1000 c.p.s. through the seismic frequencies. This broad frequency response allows the recorder to produce wiggly lines as well as variable intensity recordings. Recording element 7 may be an ink pen, an electrographic stylus, a thermographic stylus or any other direct writing device that can be adapted to record a trace in variable tone and to move transversely with respect to the movement of record 9 in accordance with signal variations from oscillator means 5.

Refer now to FIGURE 2 which shows a block diagram of a system capable of driving a thermographic recorder in accordance with the inventive method. Trace intensity control means 1 is represented by chained block 1 containing filter means 17, power amplifier 19, a 300-volt power source and potentiometer 21. Oscillator means 5 is represented by chained block 5 and includes oscillator 23, and recorder motor drive amplifier 25. Recorder means 3 is shown schematically and includes coil 27 representing a conventional recorder motor or the like for translating an electrical oscillatory signal into mechanical movement of recording element 7. Recording element 7 is electrical connected to trace intensity control means 1 and recorder motor 27 is electrically connected to oscillator means 5 as shown. Electrical conductor 29 and switch 31, shown in dotted form, connect the outputs of filter means 17 and oscillator 23. This is an optional connection that can be used to practice a variation of the basic variable intensity method as will be described hereinafter.

Oscillator 23 can be any type of circuit capable of producing oscillatory signals in a suitable range of frequencies and amplitudes. Recorder motor drive amplifier 25 can be any suitable power amplifier capable of furnishing the necessary power to drive recorder means 3 in accordance with the output signal of oscillator 23.

Filter 17 in trace intensity control means 1 can be any type of well-known seismic filter and automatic volume control system that is capable of maintaining the amplitude of signal 13 within an acceptable range of amplitude variation. Power amplifier 19 in conjunction with the 300-volt source and potentiometer 21 are designed to produce a high voltage on the tip of recording element 7. This voltage must be capable of burning record 9, which in this case is Teledeltos paper, in accordance with the polarity and amplitude of the seismic signal. More specifically, the high voltage is adjusted to produce a given trace tone on the Teledeltos paper when seismic signal 13 is at a given D.C. bias or no signal condition. This adjustment insures that all seismic signal amplitude variations are recorded in terms of a trace whose tones vary from black to very light shades of gray.

Figure 3:
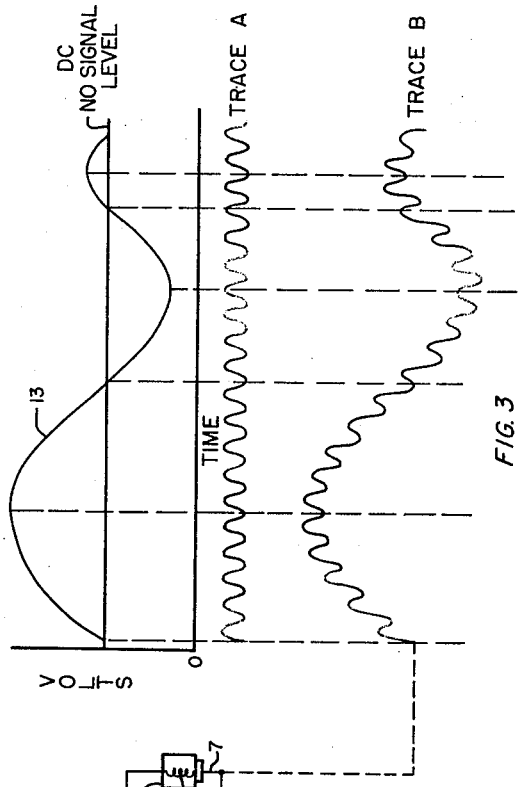
FIGURE 3 shows two types of variable intensity presentation as practiced by the inventive method.

FIGURE 3 shows seismic signal 13 and variable intensity traces A and B that can be produced by the invention. For purposes of clarity, signal 13 and traces A and B are simplified in character and traces A and B are reduced in frequency. Signal 13 is shown plotted as functions of voltage and time. The value of the line representing the D.C. bias or no signal level is adjusted to produce a burning voltage that develops a given shade of gray on the record. For purposes of illustration, the maximum and minimum amplitude variations as well as the points referred to as the D.C. no signal level are correlated with traces A and B by dashed lines. This correlation shows in a simplified form how the polarity and amplitude variations of signal 13 affect the variable intensity or tone of traces A and B. Trace A can be produced by the device shown in FIGURE 2. Trace B can be produced by the device shown in FIGURE 2 when switch 31 is closed. The dotted line from 7 represents the action of 7 when switch 31 is closed.

Refer now to FIGURE 4 which shows a circuit diagram of the device illustrated in FIGURE 2. In this case oscillator 23 includes a multivibrator made up of transistors 33, 35, their associated circuitry, an amplifier stage made up of transistor 37 and its associated circuitry, and potentiometers 39 and 41. Potentiometer 39 is used to adjust the frequency of the multivibrator while potentiometer 41 is used to control the amplitude of the multivibrator output. Recorder motor drive amplifier 25 includes an emitter-follower stage including transistor 43, a frequency compensation circuit connected to the emitter of 43, an amplifier stage including transistor 45 together with its circuit to control the D.C. operations level of amplifier 45, power amplifier 47, transformer 49 and a push pull class B amplifier made up of power transistors 51, 53 and diodes 55 and 57 connected as shown. Recorder 3 is a Massa rectilinear pen motor produced by the Massa Division of Cohu Electronics, Inc., Hingham, Massachusetts. The pen motor itself is represented by coil 27, center tapped to a −24 volt power supply and the ends of which are connected to the collectors of power amplifier transistors 51 and 53. Filter means 17 includes conventional seismic high and low band filters connected to an automatic volume control circuit such as is described in Woods et al. Patent 2,958,048, owned by a common assignee. Power amplifier 19 includes a three-stage, high voltage amplifier made up of triodes 59, 61 and 63 as well as potentiometers 65 and 21. Potentiometer 65 is used to adjust the signal amplitude of the seismic signal and in turn the burning voltage produced by the seismic signal. The 300-volt power supply is connected through switch 67 to the plates of the power amplifier tubes as shown. Potentiometer 21 is used to adjust the tone of the trace at the seismic no signal level. To develop an increased power output in triode amplifier 63, the cathode of 63 is connected to a −120 volt source as shown. This produces a 420 volt voltage difference on the last stage.

Prior to operation, the variable intensity recorder is calibrated to produce the desired trace width and intensity contrast. Normally, the following procedure is used. Power switch 67 is closed and potentiometers 39 and 41 in oscillator means 5 are adjusted. Potentiometer 39 is adjusted to drive Massa pen motor 3 at a frequency of approximately 400 c.p.s. Potentiometer 41 is adjusted to cause an amplitude of approximately ⅛ inch peak to peak in the 400 cycle movement. Although the frequency can be varied from approximately 50 to 1000 c.p.s. and the amplitude can be varied to produce an oscillatory width of from approximately ¼ inch peak to peak to pencil line width, it has been found that the recited adjustments produce a highly effective variable intensity effect for seismic records. Potentiometers 21 and 65 in trace intensity control means 1 are adjusted to produce the desired intensity contrast along the 400 cycle oscillatory trace. Potentiometer 21 is adjusted to produce the desired D.C. level about which seismic signal 13 will ride. As shown in FIGURE 3, the D.C. level is selected to insure that the maximum and minimum swing of signal 13 has sufficient burning voltage to make a continuous visible trace on the record. Power amplifier 19 in FIGURE 4 operates with a total power supply of 420 volts on the output stage and it is desirable to set potentiometer 21 to produce the D.C., no signal level, at approximately +200 volts so that the maximum amplitude signals produce burning voltages which vary between approximately +300 and +100 volts. Potentiometer 65 adjusts the amplitude variation of seismic signal 13. Generally speaking, this adjustment is limited by the maximum undistorted voltage deviation produced by power amplifier 19 and the D.C. or no signal level voltage.

In operation, the multivibrator section of oscillator means 5 produces a square wave signal of predetermined frequency which is amplified by transistor 37 and A.C. coupled to emitter follower 43 in pen motor drive amplifier 25. The A.C. coupling is used to block D.C. voltages developed at the collector of transistor 37. Emitter follower 43 and its associated circuitry serve to furnish a high impedance input and to provide necessary frequency compensation to obtain a relatively flat amplitude response over the required range of frequencies. This pen motor drive amplifier is used to drive the Massa pen motor at frequencies as low as approximately 10 c.p.s. and as high as approximately 1000 c.p.s. The resistors associated with transistors 43 and 45 are adjusted to provide temperature compensation of these transistors to insure stable D.C. operation levels over a wide temperature range. Power transistor 47 is used as an emitter-follower amplifier to provide power required to drive the class B push pull amplifier through transformer 49. As power transistors 51 and 53 are alternately switched, off and on, current from the —24 volt power supply is drawn through center tap coil 27 to cause recording stylus 7 to oscillate at the multivibrator frequency. It should be noted that resistors 69 and 71 provide the necessary feedback to produce stable operation of pen amplifier circuit 25.

Simultaneously with this operation, seismic signal 13 is passing through filter means 17. As discussed heretofore 17 includes conventional seismic high band pass and low band pass filters connected to the AVC unit described in Patent 2,958,048. The connections are conventional and the over-all filter means operates to compensate for extreme amplitude variations, to filter and to amplify. The seismic signal is then passed to power amplifier 19 where the three-stage high voltage amplifiers made up of triodes 59, 61 and 63 produce the necessary burning voltage at the tip of recording stylus 7, FIGURE 2, to produce the variable intensity effect. That is, the signal entering 19 is approximately 1 volt R.M.S. and is amplified to approximately 70 volts R.M.S. This 70 volt R.M.S. signal is added at junction 73 to the D.C. level established by potentiometer 21 as described heretofore. FIGURE 3 shows, in simplified form, the variable intensity effect. Seismic signal 13 which is used to control the intensity variation is shown correlated with traces A and B. These traces represent two kinds of variable intensity recording that can be produced by the invention. In both traces the D.C. no signal level of 13 produces a given gray tone while the maximum excursion above the D.C. level produces the darkest tone and the maximum excursion below the D.C. level produces the lightest tone. Intermediate amplitudes produce corresponding intermediate tones. The circuit shown in FIGURE 4 produces trace A. If it is desirable to record trace B, switch 31, FIGURE 2, is closed. This in effect connects the seismic signal to pen amplifier 25 as well as to power amplifier 19. In this case the seismic signal controls the intensity of the oscillating trace in the manner described above but in addition, the seismic signal is added to the oscillatory trace to produce the wiggly line variable intensity presentation shown in trace B.

Although the present invention has been described with particular reference to the presentation of a seismic signal in variable intensity form by controlling the tone or shading of the trace, it should be understood that the present invention may be similarly applied to varying the color, luminosity, brilliance or other value of a trace without departing from the scope of the invention. Therefore the scope of the subject invention is only limited by the scope of the appended claims.

We claim:
1. A method of recording a seismic signal with a direct-contact writing element to produce a variable intensity recording comprising
    (a) vibrating the direct-contact writing element that records a relatively thin oscillatory trace at a frequency sufficiently high to produce an optical effect of recording a trace having a relatively large width, and
    (b) simultaneously intensity modulating said relatively thin oscillatory trace with said seismic signal to produce an optical effect of recording said relatively large width trace in variable intensity form.
2. A method of recording a signal with a direct-contact writing element to produce a variable intensity trace comprising
    (a) supplying a constant frequency carrier having a frequency substantially above the frequency range of the signal but below a frequency of about 1000 c.p.s.,
    (b) vibrating the direct-contact writing element in accordance with said carrier frequency,
    (c) recording an oscillatory trace at said carrier frequency, and
    (d) controlling the intensity of said trace as a function of said signal wherein said signal in the no signal condition produces a given trace tone and the polarity and amplitude of said signal determine the instantaneous direction and amount of tone change from said given trace tone.
3. In a method as set forth in claim 2, wherein the tone of the trace is controlled by varying the amount of voltage applied to the direct-contact writing element.
4. In a method as set forth in claim 2, wherein the tone of the trace is controlled by varying the amount of ink applied to the direct-contact writing element.
5. In a method as set forth in claim 2, wherein the signal in the no signal condition produces a trace of intermediate tone.
6. In a method as set forth in claim 2, wherein the signal is a seismic signal.
7. In a method as set forth in claim 2, wherein the signal used to control the trace tone is simultaneously added to the constant frequency signal to produce a wiggly line variable intensity trace.
8. A method of recording a seismic signal with a direct-contact writing element to produce a variable intensity trace comprising
    (a) supplying a constant frequency signal having a frequency substantially above the frequency range of the seismic signal but below a frequency of about 1000 c.p.s.,
    (b) vibrating the direct-contact writing element in accordance with said constant frequency signal,
    (c) recording an oscillatory trace at said constant frequency,
    (d) supplying a D.C. voltage to the direct-contact writing element to produce a given tone representative of the no signal level of the seismic signal,
    (e) adding the seismic signal to said D.C. voltage wherein said seismic signal controls the tone of said oscillatory trace in accordance with the polarity and amplitude variations of said seismic signal.
9. In a method as set forth in claim 7, wherein the seismic signal is simultaneously added to the constant frequency signal wherein a wiggly line variable intensity trace is produced.
10. A direct-contact variable intensity recorder comprising
    (a) recorder means including
        (1) a recorder motor, and
        (2) a direct-contact recording element,
    (b) a trace intensity control means connected to said direct-contact recording element, and
    (c) an oscillator means connected to said recorder motor.

11. A direct-contact variable intensity recorder comprising
(a) a recorder means including
(1) a recorder motor, and
(2) a direct-contact writing element,
(b) an oscillator means including
(1) a multivibrator, and
(2) a recorder motor amplifier connected to said recorder motor,
(c) a trace intensity control means including
(1) a seismic filter-automatic volume control circuit,
(2) a power amplifier circuit connected to said seismic filter-automatic volume control circuit, and
(3) a power source connected to said power amplifier and said direct-contact writing element.

References Cited in the file of this patent

UNITED STATES PATENTS

| | | |
|---|---|---|
| 2,243,729 | Ellis | May 27, 1941 |
| 2,858,181 | Ortlieb | Oct. 28, 1958 |
| 2,928,070 | Palmer et al. | Mar. 8, 1960 |
| 2,950,459 | Loper et al. | Aug. 23, 1960 |
| 3,025,123 | Klein | Mar. 13, 1962 |